United States Patent [19]
Flockencier

[11] Patent Number: 5,357,331
[45] Date of Patent: Oct. 18, 1994

[54] SYSTEM FOR PROCESSING REFLECTED ENERGY SIGNALS

[76] Inventor: Stuart W. Flockencier, 1713 Knob Hill, Cedar Hill, Tex. 75104

[21] Appl. No.: 36,348

[22] Filed: Mar. 24, 1993

Related U.S. Application Data

[63] Continuation-in-part of Ser. No. 724,748, Jul. 2, 1991, Pat. No. 5,243,553.

[51] Int. Cl.$^5$ .............................................. G01C 3/08
[52] U.S. Cl. ........................................ 356/5; 342/135; 342/136
[58] Field of Search ................... 356/5; 342/135, 136

[56] References Cited

U.S. PATENT DOCUMENTS

| | | | |
|---|---|---|---|
| 3,661,465 | 5/1972 | Groh | 356/162 |
| 3,853,402 | 12/1974 | Nichols | 356/13 R |
| 3,900,261 | 8/1975 | Wingate | 356/5 |
| 3,947,119 | 3/1976 | Bamberg et al. | 356/5 |
| 3,959,641 | 5/1976 | Miller, Jr. et al. | 235/181 |
| 4,380,391 | 4/1983 | Buser et al. | 356/5 |
| 4,497,065 | 1/1985 | Tisdale et al. | 382/1 |
| 4,518,256 | 5/1985 | Schwartz | 356/5 |
| 4,527,894 | 7/1985 | Goede et al. | 356/28 |
| 4,560,271 | 12/1985 | Fumio | 356/5 |
| 4,569,599 | 2/1986 | Bolkow et al. | 368/120 |
| 4,699,507 | 10/1987 | Etoh | 356/5 |
| 4,733,961 | 3/1988 | Mooney | 356/5 |
| 4,768,877 | 9/1988 | Torregrosa et al. | 356/5 |
| 4,770,526 | 9/1988 | Manhart et al. | 356/5 |
| 4,888,477 | 12/1989 | Nankivil | 250/201 |
| 4,915,498 | 4/1990 | Malek | 356/5 |
| 5,179,286 | 1/1993 | Akasu | 356/5 |

FOREIGN PATENT DOCUMENTS

| | | | |
|---|---|---|---|
| 0269902 | 6/1988 | European Pat. Off. | G01S 7/10 |
| 56069569 | 10/1981 | Japan | G01S 7/36 |

*Primary Examiner*—Stephen C. Buczinski

[57] ABSTRACT

An energy pulse capture system senses, receives, and processes signals reflected from a target. In an illustrative embodiment, light pulses are reflected off of a target, received by optical equipment, converted into analog electrical signals, and then processed to obtain information therefrom. The invention basically identifies targets by measuring the time delay between a transmitted signal and a received or "return" signal. The invention includes a windowing system to more efficiently process digitized electrical signals representing the return signals. The windowing system effectively defines a "window" in memory within which the return signal is stored, and "locks" on to this window to reduce time spent searching for the return pulses among other data. In another aspect of the invention, a real time return system is used to more efficiently process the electrical signals representing the return pulses. The real time return system detects the maximum amplitude of the received signal in real time, and stores the current value of a counter used to clock data into memory, thereby facilitating later use of the stored counter value to locate signals representative of the return signal in the memory. The invention also concerns a timing delay system, which conserves memory of the invention by delaying storage of data until a return pulse is actually received.

20 Claims, 4 Drawing Sheets

SYSTEM FOR PROCESSING REFLECTED ENERGY SIGNALS

CROSS-REFERENCE TO RELATED APPLICATIONS

The present invention is a continuation in part of U.S. application Ser. No. 724,748 ('748), entitled "Gate Array Pulse Capture Device", now U.S. Pat. No. 5,243,553 filed Jul. 2, 1991 in the name of the present inventor. The '748 application is hereby incorporated by reference in its entirety.

BACKGROUND OF INVENTION

1. Field of Invention

The present invention relates to an improved system for sensing, receiving, and processing reflected energy signals such as laser light pulses. More specifically, the invention concerns a detecting and ranging system for transmitting pulses of energy, detecting energy signals and efficiently identifying a reflected "return" signal within the detected signals with reduced processing time and reduced memory usage.

2. Description of Related Art

Many different systems have been used in the past to intelligently guide projectiles such as missiles. After the laser was developed, the defense industry put laser technology to use in the form of laser detecting and ranging (LADAR) guidance systems.

In LADAR guidance systems, brief laser pulses are generated and transmitted via a scanning mechanism. Some of the transmitted pulses striking a target of interest are reflected back to a receiver associated with the transmitter. Such LADAR systems are commonly installed in projectiles such as missiles to determine the type-and location of a target. The target and surrounding area are scanned to produce an image that comprises multiple pixels. The image can then be analyzed to extract three-dimensional targeting information. The time between the transmission of a laser pulse and the receipt of the reflected laser pulse ("return pulse") is used to calculate each pixel's range.

In known LADAR systems, electronic circuitry begins a ramp function concurrently with the transmission of the outgoing pulse. The ramp function is halted when a return pulse is received. Thus, the height of the resulting ramp is directly proportional to the range to the target. Although the contour and magnitude of the return pulse contain useful information, variations may result in uncertainties as to when the ramp function should be stopped.

Ideally, a return pulse has a finite duration, and an analog ranging system terminates the ramp function mid-way through the pulse. But since the magnitude of a pulse cannot be determined in advance, it may be difficult to distinguish a return pulse from other light. Therefore, some systems set a threshold to differentiate between return pulses and other light. This may result in an inaccurate determination of range, especially where the distance between the target and the receiving optics is great, and the return pulse accordingly has a small magnitude.

Other known systems start a counter when a laser pulse is transmitted and terminate the counter when the return pulse is detected. The value of the counter is thus proportional to the distance to the target. This method suffers from some of the same threshold uncertainties as the ramp methods. In addition, the return pulse may be corrupted by noise. Moreover, the width of the return pulse will be changed as a function of the slope of the target. Thus, there remains a need for a system that reduces the uncertainties in determining a range to a target.

Another need exists in this area of technology because engineers that design missile guidance systems are almost always interested in reducing the weight, size, and expense of the associated electronics. In particular, since random access memory ("RAM") modules are often bulky and expensive, it would be desirable to have a missile guidance system that utilizes RAM more efficiently, and therefore requires less RAM.

In designing missile guidance systems, engineers are also concerned with increasing the resolution afforded by such systems. This may be accomplished by increasing the sampling rate of the system, or, in other words, increasing the frequency of the LADAR pulses emitted by the system. In systems that utilize the time between LADAR pulses to analyze stored return signals, increasing the frequency of the pulses requires that the analysis of the stored pulses must be conducted more quickly. Therefore, it would be advantageous to have a missile guidance system that requires less computation time to analyze its return signals.

SUMMARY OF THE INVENTION

The present invention is directed at the problems set forth above. The invention produces guidance correction signals by processing reflected energy signals generated by a detecting and ranging transceiver such as a LADAR receiver. In an illustrative implementation, the invention includes certain pulse capture electronics that initiate firing of a laser transmitter and determine the time-of-flight (i.e. range) and intensity of the returning laser pulses. Also, the pulse capture electronics direct this data to a processor for execution of specific targeting algorithms. The pulse capture electronics comprises a number of signal processing stages, including an analog-to-digital comparator, a RAM buffer clocked by a counter, an intelligent convolution circuit, and a peak detector.

In accordance with one aspect of the invention, an external computing device is used to decrease the time required to process signals received from the RAM by defining a "window" in the RAM within which past return signals have been stored, and "locking" on to this window to reduce time spent searching for future return signals in RAM. After identifying a return pulse, the computing device stores the memory address of the beginning of the return pulse; based on the average beginning memory address of several previous return pulses, the computing device predicts the beginning memory address of the next return pulse. This memory address is used to define a "window," within which it is likely that the next return pulse will be stored. As new return pulses are received, the window is periodically updated, enabling the computing device to effectively "lock on" to the average return pulse. In this way, the signal analysis for each return pulse is limited to a particular region of interest, since data located outside the window in the RAM is ignored.

Another aspect of the invention involves a real time return system to decrease the time required to process signals received from the RAM. In this embodiment, the pulse capture electronics include a peak detector to detect the maximum amplitude of the return signal and to store the value supplied by a counter at that point. The value of the counter, then, provides the approximate location of the return signal in the RAM. Having this knowledge, the convolution circuit is able to more efficiently read data from the RAM, since the data of the RAM can be effectively narrowed to the area of interest.

In another aspect of the invention, a timing delay system is provided to decrease the required size of RAM by delaying storage of data until a return pulse is actually received. With the timing delay circuit, analog to digital conversion of the return pulse is delayed, permitting a peak detector to identify the receipt of a return pulse on a non-delayed timeframe, and, in advance, to activate the RAM for storage of the delayed converted digital pulse.

BRIEF DESCRIPTION OF THE DRAWINGS

The nature of the invention, as well as its objects and advantages, will become more apparent to those skilled in the art after considering the following detailed description in connection with the accompanying drawings, in which like reference numerals designate like parts throughout, wherein.

DESCRIPTION OF A PREFERRED EMBODIMENT

Pulse Capture Electronics

When the present invention is applied in the context of light signals, the invention may utilize optical equipment such as that described in the above-identified parent '748 application. In the following description, specific bus sizes, data words lengths, data sample times, clock speeds, and other such features are given by way of example only, and should not be construed to limit the scope of the invention.

Figure 1:
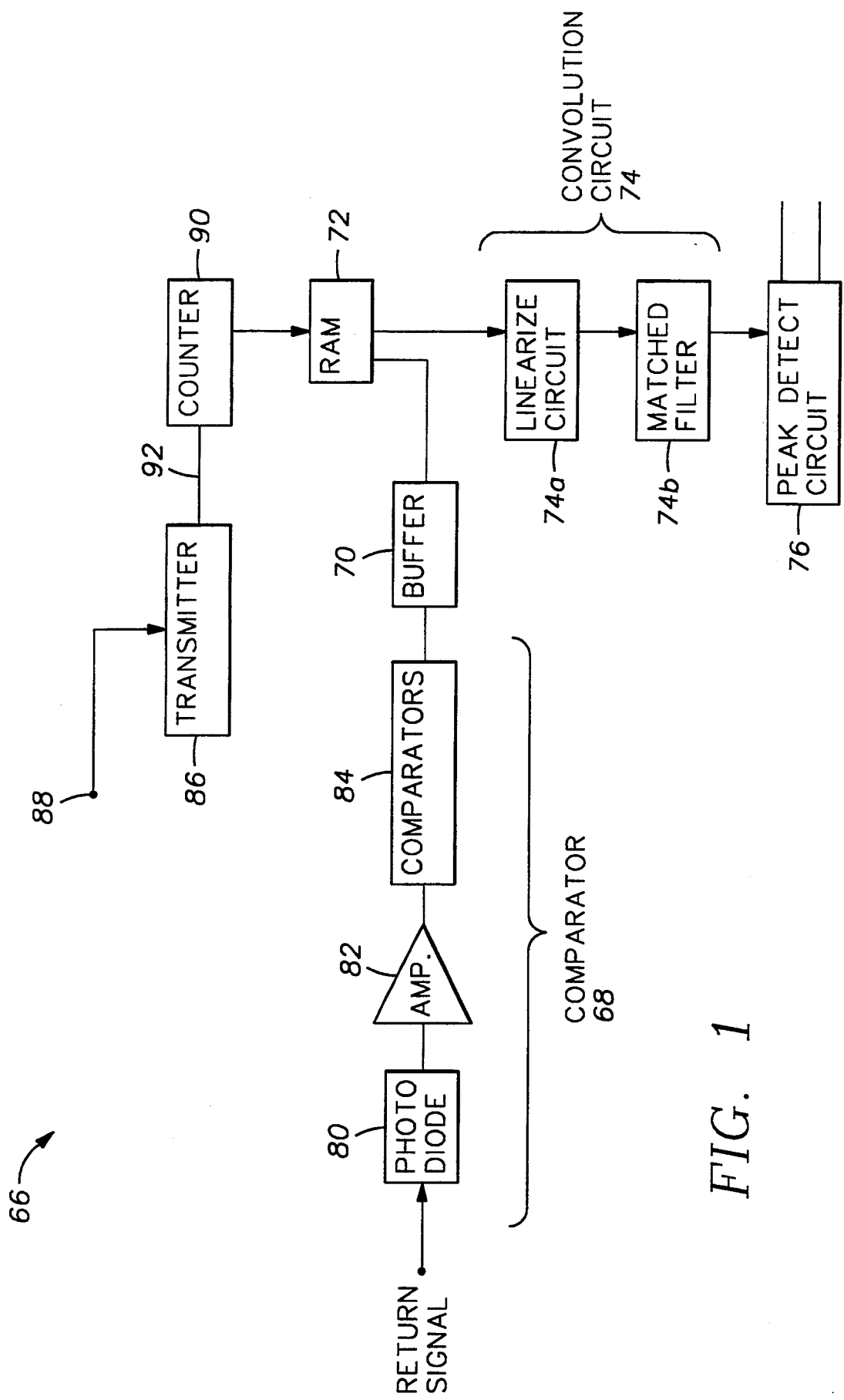
FIG. 1 is a block diagram of pulse capture electronics 66 of the present invention.

The circuitry of the present invention produces guidance correction signals by processing reflected energy signals generated by a detecting and ranging transceiver. The exemplary implementation discussed below operates in conjunction with a LADAR system to process reflected light signals. As shown in FIG. 1, the invention includes certain pulse capture electronics 66.

The pulse capture electronics 66 initiate firing of a laser transmitter 86. In an illustrative implementation of the invention, the laser transmitter 86 may transmit one or more pulses of coherent, monochromatic light. In addition to initiating firing of the transmitter 86, the pulse capture electronics 66 determines the time-of-flight (i.e. range) and intensity of the returning laser pulses. The pulse capture electronics 66 includes a number of signal processing stages, such as an analog-to-digital comparator 68; a RAM buffer 72 clocked by a counter 90; an intelligent convolution circuit 74; and a peak detector or peak detect circuit 76. The pulse capture electronics 66 may also include an optional data buffer 70, which in an illustrative embodiment comprises an emitter-coupled logic (ECL) buffer. In the preferred embodiment, the above-mentioned stages of the pulse capture electronics 66 comprise a multichannel, monolithic, digital integrated circuit with an imbedded analog comparator front end.

The comparator 68 includes an avalanche photo diode 80, an amplifier 82, and a number of nonlinear comparators 84. The avalanche photo diode 80 converts light pulses received by optical equipment (not shown) into an electrical input signal; this signal is amplified by the amplifier 82 and directed to the comparators 84. If the laser transmitter 86 is configured to transmit modulated light signals, then a circuit such as a capacitive envelope detector (not shown) is interposed between the amplifier 82 and the comparators 84 to generate a signal representative of the envelope of the received modulated signal.

Multiple comparators 84 are provided, and each comparator 84 is provided with reference voltages spaced in logarithmic intervals over the range of expected voltage signals. In an illustrative embodiment, comparators 84 comprise seven flash converters, where the converters detect signals above 10 mV, 20 mV, 40 mV, 80 mV, 160 mV, 320 mV, and 640 mV, respectively. In the illustrative embodiment, seven comparators 84 are utilized to provide seven outputs, each output with a frequency of 1 GHz. Every 1 nS, each comparator 84 whose voltage threshold is exceeded turns on, such that the comparators 84 together produce a type of signal, known as a "thermometer code."

The output of the comparators 84 is received by the buffer 70. The buffer 70 converts the "thermometer code" into a 3-bit binary word, time de-multiplexes the signal to 125 MHz, and provides eight 3-bit words in parallel to the RAM 72. Each word supplied to the RAM 72 represents a 1 nS sample of data.

The timing of the RAM 72 is controlled by the counter 90, which may comprise a 125 MHz counter. The RAM 72 is initiated when the laser transmitter 86 is triggered by a firing line 88. After the RAM 72 is initiated, the RAM 72 stores data received from the buffer 70 while receiving a clocking signal from the counter 90. The clocking signal is continued for a period of time corresponding to the maximum range of the system, whereupon the RAM 72 stops storing data. The time of flight of the laser pulse to a target and back to the electronics 66 is relatively short compared to the rate at which pulses are transmitted. Therefore, the pulse capture electronics 66 of the present invention advantageously utilizes this fact by sampling at 1 GHz and then processing the stored samples more slowly, for example, at 20 MHz.

Between receipt and storage of the next transmitted pulse, the stored samples are read and processed by the intelligent convolution circuit 74 and the peak detect circuit 76. Specifically, the convolution circuit 74 reads an entire sample of data, wherein a "sample" includes all data corresponding to light detected during the clocking of the RAM 72. The convolution circuit 74 includes a linearize circuit 74a, to convert each of the seven binary levels back to the appropriate linear threshold level (i.e. 10 Mv, 20 mV, 40mV etc.). The linearize circuit 74a may comprise a programmable read only memory (PROM) equipped with an appropriate lookup table. The convolution circuit 74 also includes a matched filter 74b to extract range and intensity information from the data it receives, despite the noise and pulse-width variations of such data. The filter 74b may comprise a Zoran model ZR33891 finite impulse response circuit. To operate the filter 74b, it is loaded with a set of coefficients representative of the expected shape (or "template") of the return pulse. The filter 74b produces evaluation numbers indicative of the degree of correlation between the template and the return signal. The operation of convolution circuits is well-known in the relevant art, and an ordinarily-skilled artisan, having the benefit of this disclosure, would be capable of implementing the convolution circuit 74 in the present invention. The peak detect circuit 76 processes the evaluation numbers from the convolution circuit 74 to determine the point in time where a "best match" occurs between the return pulse and the template. By identifying the portion of the sampled return signal that best matches the stored template, the peak detect circuit 76 effectively determines the time at which the return pulse was received. The peak detect circuit 76 may be constructed with various standard transistor-transistor-logic (TTL) circuits.

Windowing System

Figure 2:
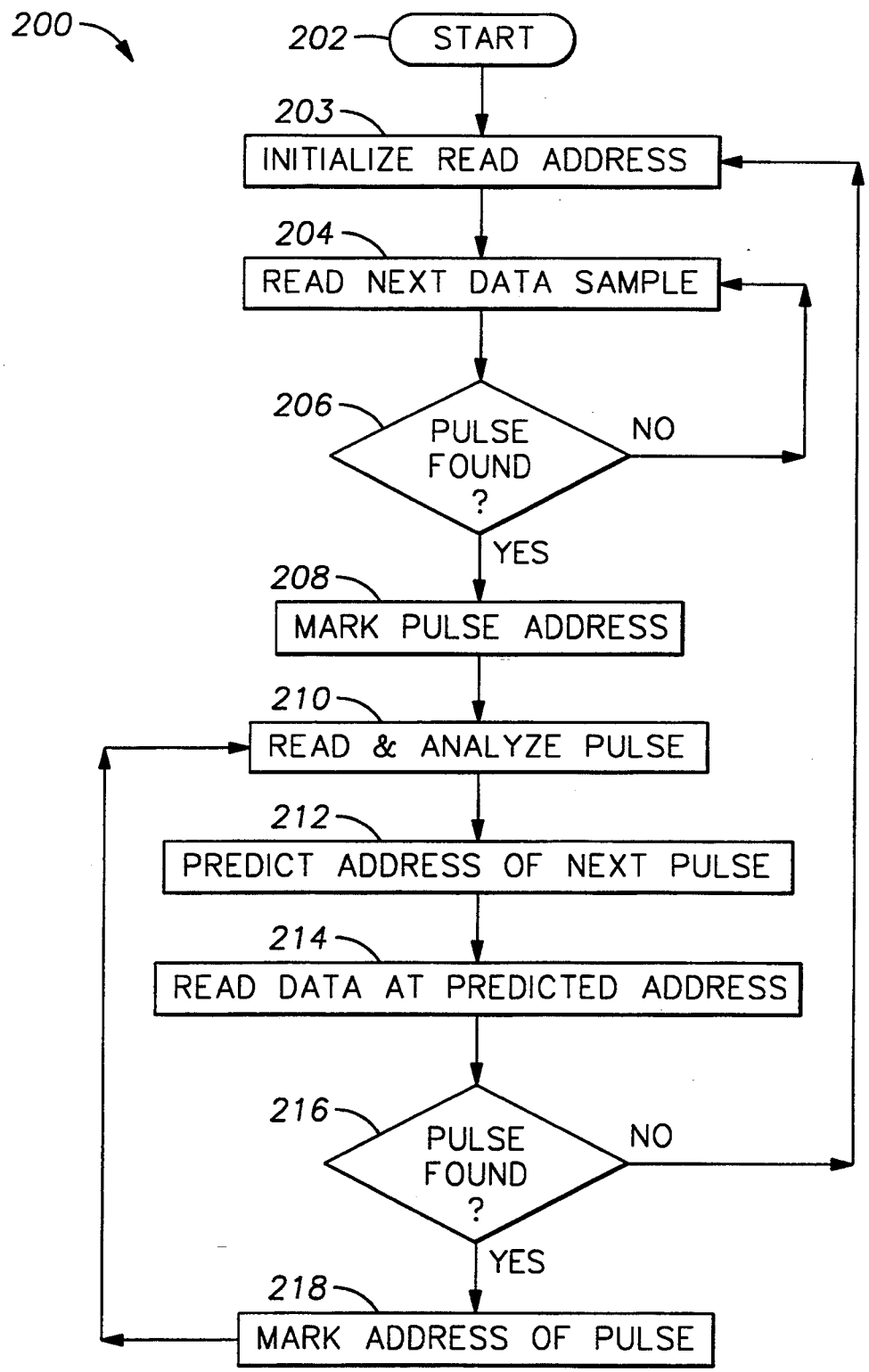
FIG. 2 is a flowchart of the process of the windowing system of the invention.

In one embodiment of the invention, an external computing device (not shown) is utilized to decrease the time required to process signals received from the RAM 72. This is accomplished by the computing device executing a number of programming lines, the source code of which is shown in order of execution in an Appendix that is attached hereto and incorporated by reference. Specifically, the computing device effectively defines a "window" in time within which the return signal is found, and "locks" on to this window to reduce time spent searching for meaningful data. Such a computing device may comprise a Motorola model DSP56000 digital signal processor. In an exemplary implementation, the window may include 100 memory locations. FIG. 2 illustrates the operation of this windowing system in greater detail by depicting a routine comprising a group of tasks 200 performed by the convolution circuit 74. After the routine begins in task 202, task 203 establishes the location of the addresses in the RAM 72 where data concerning the return pulse will be stored. Then, task 204 reads the data corresponding to a return pulse from the RAM 72. Task 204 continues to read data samples from the RAM 72 until query 206 determines that a return pulse was found. After query 204 identifies a return pulse, task 208 stores the memory address of the beginning of the return pulse; then, in task 210, the convolution circuit 74 and peak detector read the entire return pulse and analyze it.

Then, task 212 averages the marked beginning of several previous return pulses; based on this average, task 212 predicts the memory address at which the next return pulse will begin. Task 212 takes this predicted memory address, and subtracts a selected number of memory locations (e.g. 50 memory locations) to define the beginning of a "window" within which it is likely that the next return pulse will be stored. After another laser signal has been transmitted and received, task 214 begins reading data from the RAM 72 beginning with the marked window value. If query 216 determines that no return pulse was detected in the defined window, the program returns to task 203 to re-initialize the RAM 72, and start over. However, if the return pulse is identified in query 216, task 218 stores the memory address of the beginning of the return pulse, and the program continues in task 210. The process of identifying a return pulse, marking a window to predict the memory address of the next pulse, and reading and analyzing the next return pulse, if one can be identified, is repeated throughout the operation of the pulse capture electronics 66.

The routine of FIG. 2, then, effectively "locks on" to the average return pulse, and quickly locates each return pulse based on this average window. By maintaining and constantly updating the window, the routine accounts for fluctuations in the return pulses, i.e. the earlier or later receipt of return pulses. This routine serves to limit return signal analysis to a particular region of interest, since data located outside of the window in the RAM 72 is ignored. This process takes advantage of the fact that changes in the distance between the hardware components of the invention and the target will be minimal from one pulse to the next, due to the high frequency at which the pulses are transmitted.

Real Time Return System

Figure 3:
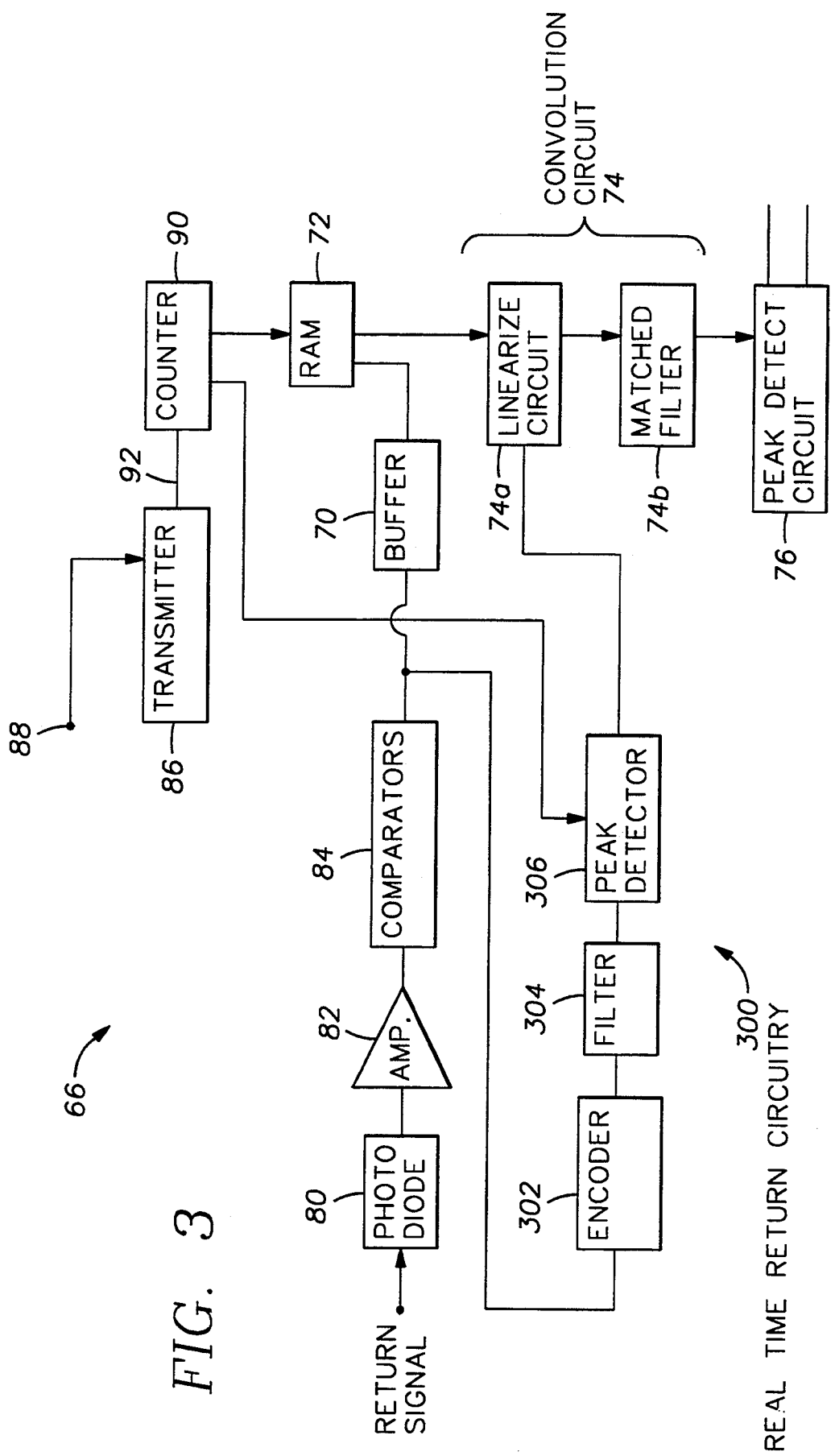
FIG. 3 is a block diagram of a real time return circuitry 300 of the invention.

Another embodiment of the invention, shown in FIG. 3, utilizes real time return circuitry 300 to establish a unique window for each pulse and to decrease the time required to process signals received from the RAM 72. Specifically, in this embodiment, the pulse capture electronics 66 include a secondary path in the form of a real time return system 300 comprising an encoder 302 electrically connected to the comparators 84, an optional filter 304 electrically connected to the encoder 302, and a peak detector 306 electrically connected to the filter 304. The function of the real time return circuitry 300 is to identify the presence of a return pulse and its approximate location; the RAM 72 will contain the precise location of the pulse. The return pulse will be many samples wide, and in an exemplary implementation the width of the return pulse may be on the order of 10 or 20 memory locations. The secondary path of the circuitry 300 operates at a lower rate than the components 80, 82, 84, and 70.

In an illustrative implementation, the encoder 302 comprises a model F100165 ECL priority encoder, or similar circuit to transform the 7-bit "thermometer" input from the comparators 84 into a 3-bit binary output representative of the magnitude of the return signal. The filter 304 comprises a filter such as a F100181 ECL adder, or another similar filter capable of averaging two or more samples together. The peak detector 304 comprises a model F100166 ECL, and operates to detect the maximum amplitude of the return signal and to store the corresponding value of the counter 90 when the maximum return signal is received.

The counter 90 is initialized when the RAM 72 is activated. When the peak detector 306 identifies a signal that indicates the receipt of a return signal, the peak detector 306 stores the value of the counter 90. This value of the counter 90 defines a window around the location of the return pulse in the RAM 72. With this knowledge, the convolution circuit 74 is able to more efficiently analyze data from the RAM 72, since the convolution circuit 74 need not read extraneous data stored in the RAM 72 prior to receipt of the return pulse.

Timing Delay System

Figure 4:
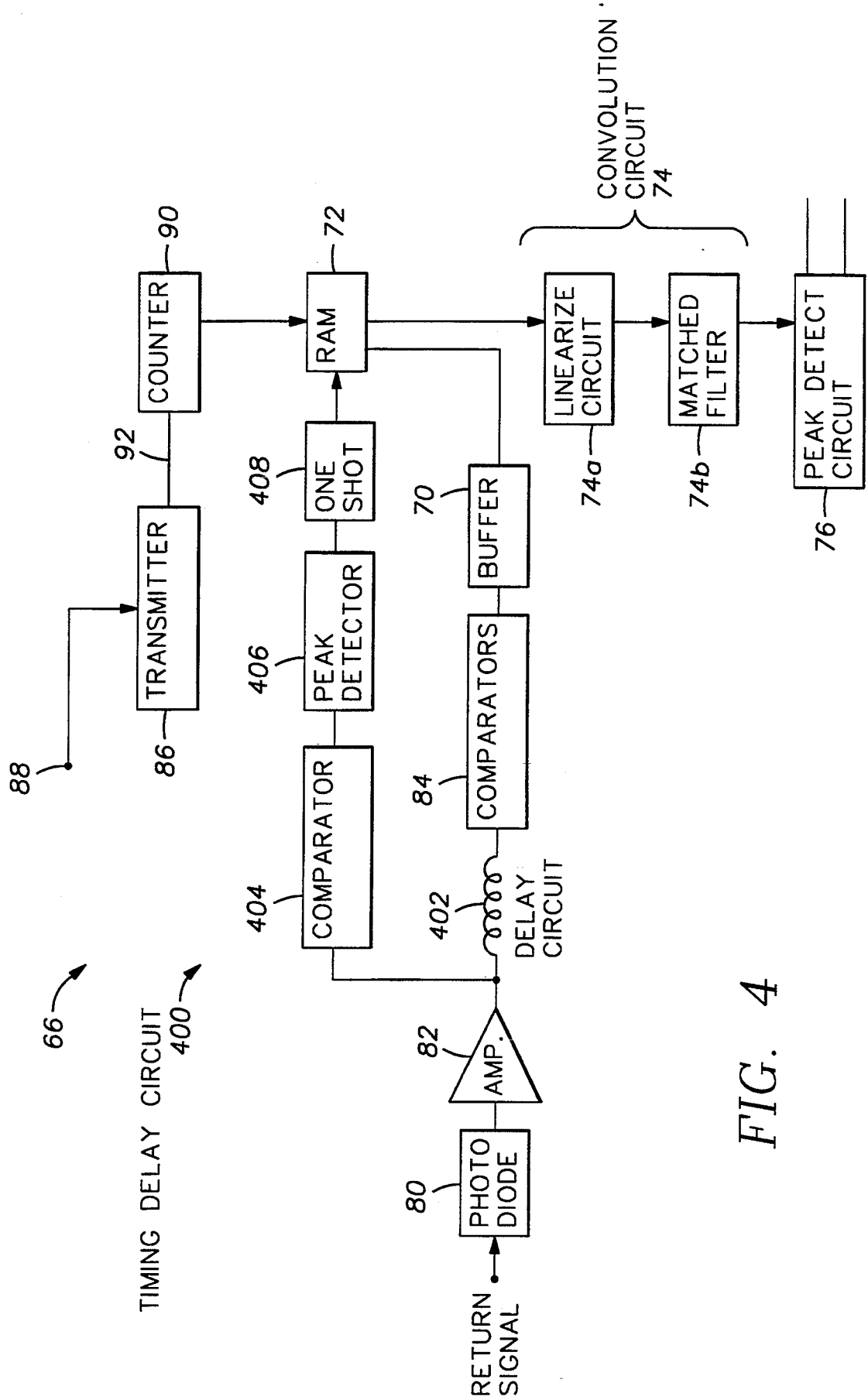
FIG. 4 is a block diagram of a timing delay system or circuit 400 of the invention.

Another embodiment of the invention, shown in FIG. 4, includes a timing delay system or circuit 400 to decrease the required size of the RAM 72. Specifically, the circuit 400 delays storage of data until a return pulse is actually received, thereby conserving memory and placing each captured return pulse in the same region of memory.

The circuit 400 includes a delay circuit 402, which may comprise a coil of wire, fiber optic link, an arrangement of transistors, or another circuit for introducing a 20–30 nS delay into the signal produced by the amplifier 82. The circuit 400 also includes a comparator 404, which may comprise a circuit similar to the comparator 84. The circuit 400 additionally includes a peak detector 406, which operates to provide an output indicative of the largest magnitude signal detected received from the comparator 404. Unless it is reset, the output of the peak detector 406 is updated only if the peak detector 406 receives a signal having a larger magnitude than the previously detected peak. Whenever the peak detector 406 is updated with such a signal of larger magnitude, a one shot 408 is triggered, thereby providing an output pulse to the RAM 72. This pulse causes the RAM 72 to begin storing data received by the buffer 70; such storage continues until the pulse produced by the one shot 408 ends.

The circuit 400 therefore effectively "triggers" the RAM 72 to store data for a preselected time period, by selectively enabling the RAM 72 when a signal of sufficient magnitude is detected. The storage performed by the RAM 72 is clocked by the counter 90, and the preselected period is determined by the width of the pulse provided by the one shot 408. By establishing the width of the one shot pulse to be greater than the expected return pulse, the RAM 72 can be controlled to effectively store the entire return pulse. After storage of a return pulse is completed, the peak detector 406 is reset.

Conclusion

The present invention offers a number of advantages to its uses. For example, the windowing and real time return systems facilitate reduced processing times by enabling the convolution circuit 74 to more efficiently locate the return pulsed thereby eliminating time spent processing unimportant data. The real time return system prevents wasted data storage that would otherwise occur when receipt of a return signal is thwarted due to an event such as missile pitching, rolling, or passing by an object such as a building or cliff; this is possible, since the search of the RAM 72 is coordinated with detection of an actual return signal. One particular advantage of the timing delay system of the invention is that it requires less RAM than prior arrangements.

While there have been shown what are presently considered to be preferred embodiments of the invention, it will be apparent to those skilled in the art that various changes and modifications can be made herein without departing from the scope of the invention as defined by the appended claims.

APPENDIX
© Copyright 1993, Loral Vought Systems, Inc.
All Rights Reserved

```
RGVALAQ    move         x:(r1),y1
           move         x:<maxrng,x1
           cmp y1,a     x:<nomrng,x0
           tmi x1,b
           jmi <setskp1
           bset #0,x:<rgflag                 ;Set b0 of rgflag
setskp1    sub x0,b     x:(r0),y1
           move         x:(r3+n3),a          ;Load old RGVAL and RGDELT
           jsr <COMPRG                       ;Compute new RGVAL
           move         a,x:(r3)             ;Store new RGVAL
           rts
RGDLTAQ    move         x:(r1),y1
           move         x:<maxrng,x1
           cmp y1,a     x:<nomrng,x0
           tmi x1,b
           jmi <setskp2
           bset #1,x:<rgflag                 ;Set b1 of rgflag
setskp2    sub x0,b     x:(r0),y1
           move         x:(r3+n3),a          ;Load old RGVAL AND RGDELT
           jsr <DUPCOD1
           rts
DUPCOD1    move         y:(r3+n3),x0
           add x0,a
           jsr <COMPRG                ;Compute new RGVAL
NEWDLT     move         x:(r3),x0    ;Load RGVAL1
           sub x0,a                  ;Compute RGVAL6-RGVAL1
           move         a,y:(r3)
           rts
COMPRG     move b,y0                  ;Move d-nomrng to y0
           mac y1,y0,a                ;New rg = old rg +
cfactor*(d-nomrng)
           rts
RGVALTR    move         x:(r1),y1   ;Load intensity threshold
           cmp y1,a     x:<nomrng,x0 ;Compare max i with
intensity threshold
           jmi <useold
           bset #0,x:<rgflag          ;Set b0 of rgflag
           sub x0,b     x:(r0),y1
           move         x:(r3+n3),a  ;Load old RGVAL
           jsr <COMPRG                ;Compute new RGVAL
           move         a,n:(r3)     ;Store new RGVAL
useold     rts
RGDLTTR    move         x:(r1),y1   ;Load intensity threshold
           cmp y1,a     x:<nomrng,x0 ;Compare max i with
intensity threshold
           jmi <useold1
```

-continued

APPENDIX
© Copyright 1993, Loral Vought Systems, Inc.
All Rights Reserved

```
         bset #1,xi<rgflag              ;Set b1 of rgflag
         sub x0,b          x:(r0),y1
         move              x:(r3+n3),a  ;Load o1 RGVAL and RGDELT
         jsr <DUPCOD1
useold1  rts
         endsec
```

© Copyright 1993, Loral Vought Systems, Inc.
All Rights Reserved

What is claimed is:

1. A system for processing an analog light signal transmitted by a light source and reflected by a target, comprising:
   (a) an analog-to-digital converter to receive analog light signals and convert the received light signals into digital electrical signals;
   (b) a memory having a plurality of addresses to store digital signals received from the analog-to-digital converter;
   (c) a counter providing counter values to regulate the storage of the digital signals in the memory;
   (d) a real time return system including a peak detector operatively coupled to the converter to identify the receipt of a target-reflected signal and store the value of the counter occurring at the time of such receipt; and
   (e) convolution and peak detecting circuits to utilize the stored counter value to located digital signals representative of the reflected pulse in the memory, and to process the representative digital signals.

2. The system of claim 1, wherein the real time return system further comprises an encoder to encode digital signals received from the converter for use by the peak detector.

3. The system of claim 1, wherein the light source comprises a laser.

4. A method of processing analog light signals transmitted by a light source and reflected by a target, comprising the steps of:
   (a) receiving an analog light signal and converting the received light signal into a digital signal;
   (b) storing the digital signal in a plurality of memory addresses in accordance with timing signals provided by a counter;
   (c) independently detecting the receipt of the reflected signal and storing the counter value occurring when the reflected signal is stored in the memory;
   (d) reading digital signals stored in a block of adjacent addresses in the memory, wherein the first address in the block corresponds to the stored counter value; and
   (e) processing the digital signals so read.

5. The method of claim 4, wherein the step of independently detecting the receipt of the reflected signal is performed by a peak detecting circuit.

6. The method of claim 5, further including the step of resetting the peak detecting circuit subsequent to storage of the digital signal in the memory.

7. The method of claim 4, wherein the light source comprises a laser.

8. A system for processing an analog light signal transmitted by a light source and reflected by a target, comprising:
   (a) an analog-to-digital comparator to receive analog light signals and convert the received light signals into digital electrical signals;
   (b) a delay circuit electrically connected to the analog-to-digital comparator to delay digital signals of the comparator for a selected time;
   (c) a memory electrically connected to the delay circuit, the memory having a plurality of addresses to store delayed digital signals received from the comparator;
   (d) a counter providing clock values to regulate the storage of the delayed digital signals in the memory; and
   (e) a timing circuit electrically connected to the analog-to-digital comparator to detect the receipt of a reflected signal and to selectively activate the memory to store the delayed digital signals in response to said detection.

9. The system of claim 8, wherein the delay circuit comprises a coil of wire.

10. The system of claim 8, wherein the delay circuit comprises a fiber optic link.

11. The system of claim 8, wherein the delay circuit comprises one or more transistors.

12. The system of claim 8, wherein the light source comprises a laser.

13. The system of claim 8, wherein the timing circuit includes a peak detector to detect the receipt of a reflected signal.

14. The system of claim 13 wherein the timing circuit includes a monostable multivibrator operatively coupled to the memory to initiate storage of delayed digital signals in the memory for a predetermined time in response to said detection.

15. A method of processing analog light signals transmitted by a light source and reflected by a target, comprising the steps of:
   (a) receiving an un-delayed analog light signal;
   (b) delaying the analog light signal to convert the delayed light signal into a delayed digital signal;
   (c) detecting the receipt of a reflected signal in the un-delayed light signal; and
   (d) initiating storage of the delayed digital signal in the memory in response to said detection.

16. The method of claim 15, wherein the light source comprises a laser light source.

17. The method of claim 15, wherein the step of detecting the receipt of the reflected signal is performed by a peak detecting circuit.

18. The method of claim 17, further including the step of resetting the peak detector subsequent to the step of detecting the receipt of the reflected signal.

19. A method of processing analog energy signals transmitted by an energy source and reflected by a target, comprising the steps of:

(a) receiving an analog light signal including a target-reflected signal and converting the received light signal into a digital signal;
(b) storing the digital signal in a block of memory addresses, the storage being synchronized with clock values supplied by a counter;
(c) defining in the block of memory addresses a window of adjacent memory addresses predicted to include data corresponding to the target-reflected signal based upon relationships between memory address blocks in which prior digital signals were stored in the memory and addresses in those blocks in which corresponding target-reflected signals were stored; and
(d) processing the digital signals stored in the memory addresses defined by the window.

20. The method of claim 19, wherein the light source comprises a laser.

* * * * *

UNITED STATES PATENT AND TRADEMARK OFFICE
CERTIFICATE OF CORRECTION

PATENT NO. : 5,357,331
DATED : October 18, 1994
INVENTOR(S) : Stuart W. Flockencier It is certified that error appears in the above-indentified patent and that said Letters Patent is hereby corrected as shown below:

Column 4, line 27, after the word "signal" delete --,--.

Column 4, line 60, change "Mv" to --mV-- and "40mV" to --40 mV--.

Column 4, line 66, change "pulse-width" to --pulse width--.

Column 8, line 11, change "pulsed" to --pulse,--.

Signed and Sealed this

Twenty-eight Day of March, 1995

Attest:

BRUCE LEHMAN

Attesting Officer         Commissioner of Patents and Trademarks